United States Patent
Fryshman

(10) Patent No.: US 8,855,374 B2
(45) Date of Patent: Oct. 7, 2014

(54) INSECT IMAGE RECOGNITION AND INSTANT ACTIVE RESPONSE

(76) Inventor: Bernard Fryshman, Brooklyn, NY (US)

(*) Notice: Subject to any disclaimer, the term of this patent is extended or adjusted under 35 U.S.C. 154(b) by 61 days.

(21) Appl. No.: 13/542,416

(22) Filed: Jul. 5, 2012

(65) Prior Publication Data

US 2013/0011011 A1 Jan. 10, 2013

Related U.S. Application Data

(60) Provisional application No. 61/504,462, filed on Jul. 5, 2011.

(51) Int. Cl.
| | |
|---|---|
| G06K 9/00 | (2006.01) |
| G06T 7/00 | (2006.01) |
| A01M 1/02 | (2006.01) |
| A01M 3/00 | (2006.01) |
| A01M 1/06 | (2006.01) |
| A01M 5/04 | (2006.01) |
| A01M 1/20 | (2006.01) |

(52) U.S. Cl.
CPC ............... *A01M 5/04* (2013.01); *G06T 7/0004* (2013.01); *A01M 1/026* (2013.01); *A01M 3/00* (2013.01); *G06T 2207/10056* (2013.01); *G06K 2209/17* (2013.01); *A01M 1/06* (2013.01); *G06T 2207/10024* (2013.01); *A01M 1/2094* (2013.01); *A01M 3/005* (2013.01); *A01M 3/007* (2013.01); *G06T 2207/30128* (2013.01)
USPC ........................................... 382/110; 348/135

(58) Field of Classification Search
USPC ......... 382/100, 110, 162, 164, 165, 181, 190, 382/195; 348/135
See application file for complete search history.

(56) References Cited

U.S. PATENT DOCUMENTS

| | | | | |
|---|---|---|---|---|
| 4,094,088 | A  * | 6/1978 | Harrell | 43/144 |
| 6,508,033 | B2 * | 1/2003 | Hessel et al. | 47/60 |
| 6,671,582 | B1 * | 12/2003 | Hanley | 700/245 |
| 7,765,780 | B2 * | 8/2010 | Koselka et al. | 56/10.2 A |
| 7,830,504 | B2 * | 11/2010 | Deppermann et al. | 356/305 |
| 7,854,108 | B2 * | 12/2010 | Koselka et al. | 56/10.2 A |
| 8,381,501 | B2 * | 2/2013 | Koselka et al. | 56/10.2 A |
| 8,391,550 | B2 * | 3/2013 | Pachys | 382/103 |
| 2001/0036295 | A1* | 11/2001 | Hendrickson et al. | 382/110 |
| 2005/0126144 | A1* | 6/2005 | Koselka et al. | 56/10.2 R |
| 2011/0211733 | A1* | 9/2011 | Schwarz | 382/110 |

* cited by examiner

*Primary Examiner* — Anand Bhatnagar
(74) *Attorney, Agent, or Firm* — Levisohn Berger LLP

(57) ABSTRACT

A device for detecting insects on substrates such as lettuce and other leaves. The device has a microscope lens which magnifies a portion of the leaf and send an image of the leaf portion to an image recognition system. If the image recognition system detects the presence of an insect—further steps are taken to remove the insect.

6 Claims, 2 Drawing Sheets

INSECT IMAGE RECOGNITION AND INSTANT ACTIVE RESPONSE

RELATED APPLICATIONS

This Application claims the benefit of U.S. Provisional Application Ser. No. 61/504,462, filed Jul. 5, 2011—the contents of which are incorporated herein.

FIELD OF THE INVENTION

The current invention relates to the field of insect control, more specifically to a novel method of rapidly detecting and disposing of insects dispersed over areas from small to large.

BACKGROUND OF THE INVENTION

The decreased use of pesticides on the one hand and the decreased effectiveness of those which are in use has resulted in a disturbing proliferation of insects in food and in the home.

The invention described herein makes it possible to detect and immediately dispose of thrips, mites and aphides, among other insects, including those invisible to the untrained and unpracticed eye.

Many such insects are very difficult to dislodge by washing and are resistant to pesticides. Large scale efforts such as by heating often harms the food or other material to be cleansed.

SUMMARY OF THE INVENTION

The invention disclosed herein is a computer image analysis system, which magnifies an image of a substrate to be checked for bugs and is trained to recognize various bugs commonly associated with such substrates to be checked. If a bug is identified any of various action steps are taken in different embodiments of the invention, including removing the bug by way of an action head associated with the imaging device.

DETAILED DESCRIPTION OF THE INVENTION

Embodiments of the present invention will now be described with reference to the above-identified figures. However, the drawings and the description herein of the invention are not intended to limit the scope of the invention. It will be understood that various modifications of the present description of the invention are possible without departing from the spirit of the invention. Also, features or steps described herein may be omitted, additional steps or features may be included, and/or features or steps described herein may be combined in a manner different from the specific combinations recited herein without departing from the spirit of the invention, all as understood by those of skill in the art.

In one preferred embodiment, a lens is used to point at a leaf of lettuce and capture an enlarge image thereof. The image is then sent an image to a processor that is trained to recognize the general characteristics and color of the lettuce, and which is also trained to recognize physical characteristics and features of insects typically found on lettuce. The image is magnified so that the presence of the insect, even if well hidden, will be identified by comparison with its library of insects.

The identification of the insect will immediately trigger a response in an action head which is attached to the lens housing and is capable of moving to the insect position, and removing or destroying the insect automatically. In another embodiment of the invention, rather than removing an observed insect—an action head grips the piece of lettuce and discards or it.

Figure 1:
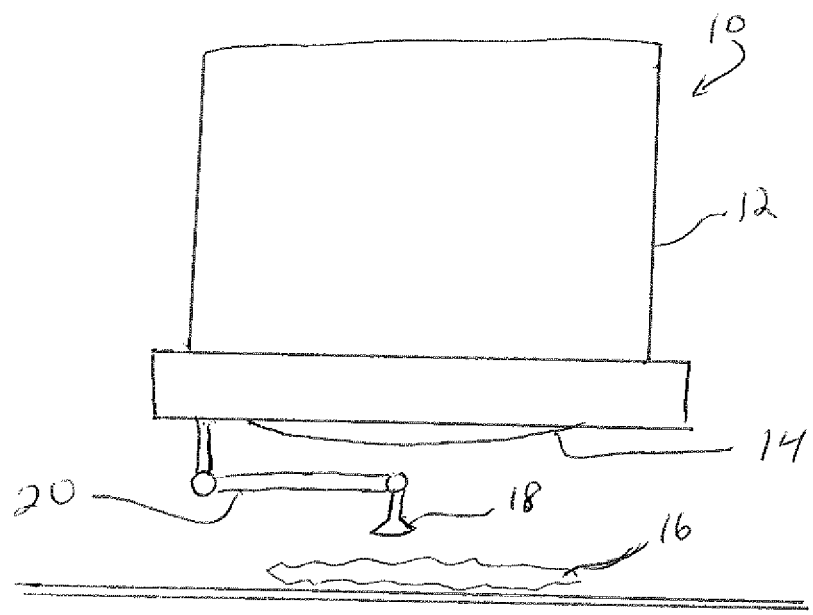
FIG. 1 shows a schematic side view of a scanning device disposed above a substrate to be checked according to an embodiment of the invention.

FIG. 1 shows a scanning device having a casing 12, which houses an image recognition system. A downward facing microscope or similar lens 14 is located at a bottom portion of the scanning device. As shown, the lens 14 is directed at a substrate 16, such as, for example, a piece of lettuce. The lens magnifies a segment of a substrate to be checked and it feeds captured images to image recognition system for image analysis. Images may be stored on a digital storage medium.

It will be understood by those of ordinary skill in that the device 10 may be provided with a plurality of differently powered lenses which may be automatically adjusted when higher focusing power is needed. It will also be understood that the image recognition system need not be housed within the casing 12 of the device—but rather the image recognition software may be provided at a location that is distant from the image-capturing device. In such embodiment, an image-capturing device (e.g. a microscope lens coupled to an image capturing system) is utilized to capture images. The images are then sent by a wired or wireless connection to an image classifier.

FIG. 1 shows an action head 18, which is provided at the distal end of a movable arm 20. The action head may be equipped with one or more instruments, such as a gripping device and/or a suctioning device. In another embodiment of the invention, the action head is provided with a heating element or such similar heat source—which can destroy a bug or a segment of lettuce when it is brought into direct contact therewith.

In one embodiment of the invention, the device 10 housing the lens 14 and action head 18 is a handheld unit, which may be manually or automatically moved across a stationary substrate such as a leaf of lettuce. In another embodiment the device 10 is mounted on a stationary support and a conveyor belt positioned below the device delivers items to be scanned below the microscope lens of the device. Still in other embodiments of the invention, the device is mounted to a linear motion track and it incrementally moves (for instance by incremental movements of a rack and pinion wheel controlled by a computer) across a substrate to be searched. It will be further understood that the moveable arm described herein may be its own detached unit, but which operates under the control of the software.

The action head 18, in an embodiment of the invention, is attached to the distal end of a movable arm. The arm is movable by way of ball joints, linear motion tracks or other such similar movement systems. When a bug is detected by the image recognition system, the software is programmed to send a signal to the moveable arm. The moveable arm is then controlled by a software application and directed to the located bug. The action head is deployed to either destroy the bug as described above or to suction it off of the substrate. In one embodiment of the invention, rather than directing the action head to a specific location—the moveable arm is directed to push the piece of lettuce (or other substrate) away thereby discarding the same or removing it from a batch.

The computer used to control operations, execute routines and store data may comprise at least one or more processors and memory storage devices. The computer also may receive a number of inputs and outputs for communicating information externally.

It will be understood that the computer which operated the device may operate under the control of an operating system and software applications, components and programs that execute the routines and systems described herein. In general, the routines executed to implement the embodiments of the invention, whether implemented as part of an operating system or a specific application, component, program, object, module or sequence of instructions will be referred to herein as "the system", or "software". The software controls the image acquisition, image storage, image analysis and movements of the arm, action head and/or the movement of the device along a track.

Figure 2:
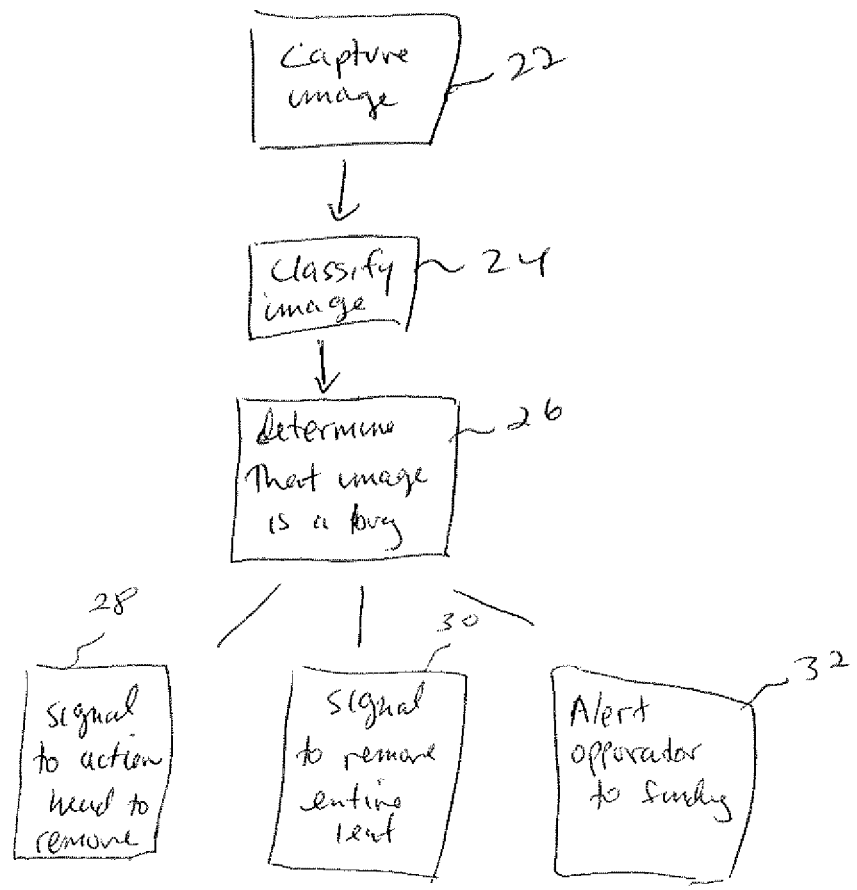
FIG. 2 is a flow chart showing software processing steps according to an embodiment of the invention.

FIG. 2 shows a number of processing steps performed by the software in an exemplary embodiment of the invention.

The device is initiated and begins capturing images 22. The images are sent to an image recognition system which classifies various images 24. The classifier may be an algorithmic classifier or a neural network system. The image recognition system is trained to recognize morphological/physical characteristics of bugs. The image recognition may also be trained to detect pixel concentrations—which may indicate the presence of bug.

If an image is determined to be a bug 26, then the software performs further processing steps.

In one embodiment, the software sends a signal to the moveable arm 28, which directs the action head to the location of the bug to remove the same according to the teachings described above.

In another embodiment of the invention, the software sends a signal to the moveable arm to push aside the item 30 upon which the bug was detected.

Still in another embodiment of the invention, upon detecting a bug, the software sends or sounds an alert to a human operator 32. The human operator may intervene to remove the bug or the item.

The invention in another preferred embodiment will be designed to deal with one kind of insect on one kind of food or other material. A single kind of action suitable for the situation will be built into this device.

Extension is obvious to a more sophisticated device with software taught to deal with many different kinds of foods and materials, to recognize a range of different insects, and different means of removing the insect, including vacuum, a glue head, an electrical charge, freezing, heat, or even a drop of powerful insecticide. Powerful pesticides sprayed or deposited over a large area is harmful: a drop on the insect itself will dispatch the insect and not affect the surrounding atmosphere.

In another embodiment, there will be an array of lenses and response heads so that a sheet being inspected for bed bugs can be continuously passed under the array.

It is obvious to anyone skilled in the art that the invention can be modified to be used as a stand-alone, hand held device, or fixed in pace with items to be inspected passing through. It is also evident that lens/action heads can be in a circular pattern, and on both sides of the material, as in both sides of a sheet.

It should be understood that the preferred embodiment was described to provide the best illustration of the principles of the invention and its practical application to thereby enable one of ordinary skill in the art to utilize the invention in various embodiments and with various modifications as are suited to the particular use contemplated.

What is claimed is:

1. A device for detecting bugs, comprising:
    an image capturing device, said image capturing device comprising a lens;
    an image recognition system connected to said image capturing device, said image recognition system being trained to recognize characteristics of bugs;
    a moveable arm, said moveable arm deployable to contact a substrate that is being searched for bugs;
    an action head provided on said movable arm; and
    software configured to detect a presence of a bug and to control said moveable arm, whereby said software directs said action head to a bug when a presence of a bug is detected.

2. The device of claim 1, whereby said image recognition system is trained to recognize morphological characteristics of bugs.

3. The device of claim 1, whereby said image recognition system is trained to recognize physical characteristics of bugs.

4. The device of claim 1, whereby said image recognition is trained to recognized pixel concentrations.

5. The device of claim 1, whereby said action head comprises a means for removing an insect.

6. The device of claim 1, whereby said software directs said movable arm to push away a substrate when a presence of a bug is detected.

* * * * *